United States Patent [19]

Sakakibara et al.

[11] Patent Number: 5,753,063
[45] Date of Patent: May 19, 1998

[54] METHOD OF DECORATING RUBBER EXTRUDED PRODUCT

[75] Inventors: Yasuo Sakakibara; Keizo Hayashi, both of Aichi; Nobuya Kobayashi, Shizuoka, all of Japan

[73] Assignee: Toyoda Gosei Co., Ltd., Aichi, Japan

[21] Appl. No.: 577,042

[22] Filed: Dec. 22, 1995

[30] Foreign Application Priority Data

Dec. 27, 1994 [JP] Japan ................. 6-325514
Dec. 27, 1994 [JP] Japan ................. 6-325526
Oct. 24, 1995 [JP] Japan ................. 7-275595

[51] Int. Cl.$^6$ .................... B29C 47/00; B32B 31/18; B32B 31/20
[52] U.S. Cl. .............. 156/219; 156/244.19; 156/244.27; 156/267; 156/290; 156/307.1; 156/308.2; 264/173.1
[58] Field of Search .............. 156/244.11, 244.18, 156/244.12, 244.23, 244.24, 244.25, 244.26, 244.19, 244.27, 219, 267, 290, 308.2, 311, 322, 307.1; 264/177.1, 177.2, 284, 173.1

[56] References Cited

U.S. PATENT DOCUMENTS

| | | | |
|---|---|---|---|
| 2,439,043 | 4/1948 | Evans | 156/244.12 |
| 2,867,001 | 1/1959 | Lewis et al. | 264/284 |
| 3,551,242 | 12/1970 | Boeke | 156/244.19 |
| 3,830,140 | 8/1974 | Rausing et al. | 156/244.27 |
| 3,862,869 | 1/1975 | Peterson et al. | 156/244.27 |
| 3,904,470 | 9/1975 | Fukuki et al. | 156/308.2 |
| 3,962,018 | 6/1976 | Costemalle et al. | 156/322 |
| 4,090,906 | 5/1978 | Zoller | 156/244.27 |
| 4,119,452 | 10/1978 | Stolpe et al. | 156/244.19 |
| 4,537,825 | 8/1985 | Yardley | 428/327 |
| 4,833,194 | 5/1989 | Kuan et al. | 524/525 |
| 5,415,822 | 5/1995 | Cook | 156/244.24 |

FOREIGN PATENT DOCUMENTS

| | | |
|---|---|---|
| 0 263 273 | 4/1988 | European Pat. Off. . |
| 0 372 745 | 6/1990 | European Pat. Off. . |
| 0 412 217 | 2/1991 | European Pat. Off. . |
| 0 419 738 | 4/1991 | European Pat. Off. . |
| 0 423 407 | 4/1991 | European Pat. Off. . |
| 2541176 | 8/1984 | France . |
| 26 54 671 | 6/1977 | Germany . |
| 2194926 | 3/1988 | United Kingdom . |

OTHER PUBLICATIONS

European Search Report, Oct. 3, 1996, 95/87315 EP.

*Primary Examiner*—Richard Crispino
*Attorney, Agent, or Firm*—Cushman Darby & Cushman IP Group of Pillsbury Madison & Sutro LLP

[57] ABSTRACT

In a method of decorating a rubber extruded product, a decoration film made of a thermoplastic resin is laminated by use of thermal fusion onto a decorating part of a vulcanized rubber extruded product. The decoration film is extruded at a predetermined thickness and width independently of the vulcanized rubber extruded product. Thereafter, the decoration film is pressure-bonded and thermally fused to the decorating part of the vulcanized rubber extruded product by pressure rollers before curing.

2 Claims, 4 Drawing Sheets

METHOD OF DECORATING RUBBER EXTRUDED PRODUCT

FIELD OF THE INVENTION

The invention relates to a method of decorating a rubber extruded product, and is particularly suitable as the decorating method for use in decorating a trim portion of an extruded weather strip.

BACKGROUND OF THE INVENTION

A method of decorating a rubber extruded product in which a decoration film, made of an uncured thermoplastic resin immediately after extrusion, is laminated directly or without using an adhesive agent layer on a decorating part of a rubber extruded product is disclosed in U.S. Pat. No. 4,537,825 and European Patent No. 0372745B1.

The decoration film is laminated using thermal fusion by directly conducting an extrusion onto the surface of a vulcanized rubber extruded product in an offset die, and then regulating the thickness or shape of the decoration film in a sizing space defined by the surface of the decorating part of the vulcanized rubber extruded product and the die orifice.

In such a prior art method, however, the thickness of the decoration film is adjusted in the extrusion space defined by the vulcanized rubber extruded product and the die orifice while inserting the vulcanized rubber extruded product into the offset there is a possibility that the vulcanized rubber extruded product will move vertically during the taking up process, thus make thickness control difficult to conduct. Furthermore, sliding friction, which is generated when the vulcanized rubber extruded product is moved in an extrusion die, causes the take-up resistance to be easily increased.

On the other hand, weather strips include those in which the whole periphery is not used as a decorating part or there is a part which is not to be decorated. For example, parts such as a rocker in an opening trim, hereinafter referred to as a "non-decorating part", will be present and also those in which a trim portion of such a part is changed in section shape. Where such a weather strip is adopted, it is possible to reduce the amount of material used for the decoration film.

Conventionally, when such a weather strip is to be intermittently decorated, different portions are separately extruded, the extruded portion are cut, and the cut portions are then connected to each other.

In such a prior art intermittent decorating method, however, operations of separately extruding portions, cutting the portions, and then connecting the portions to each other are required to be conducted, and hence it is difficult to mechanize the operations. Furthermore, an operation of applying an adhesive agent is also required. As a result, the method is inferior in productivity.

To comply with this, it may be considered to employ a method of decorating a rubber extruded product which is disclosed in the aforementioned U.S. Patent, or the European Patent. The decoration film is a non-decorating part is cut away after the execution of the method. However, the bonding between the decoration film and the extruded vulcanized rubber is usually strong, and hence it is difficult to cleanly cut away the decoration film. Further, such cutting operation requires many man hours, with the result that the process is not practical.

The decoration film is laminated with thermal fusion by directly conducting an extrusion onto the surface of a vulcanized rubber extruded product (trim) in an offset die, and then extruding the decoration film from an extrusion space defined by the surface of the vulcanized rubber extruded product and the die orifice. Therefore, this lamination method cannot be applied to the case where the section of a vulcanized rubber extruded product is changed in a non-decorating part.

In other words, conventionally, the process is deemed difficult in which a decoration film is laminated on, e.g., adhered to, the upper face of a vulcanized rubber extruded product substantially concurrently with extrusion, thereby intermittently decorating the vulcanized rubber extruded product.

SUMMARY OF THE INVENTION

It is a first object of the present invention to provide a method of decorating a rubber extruded product in which, in view of the prior art described above, the thickness of a decoration film can be easily controlled and the take-up resistance of a vulcanized rubber extruded product is small.

It is a second object of the present invention to provide a method of intermittently decorating a rubber extruded product in which a decoration film is laminated onto the upper face of the vulcanized rubber extruded product substantially concurrently with extrusion, thereby enabling the vulcanized rubber extruded product to be intermittently decorated with excellent productivity.

It is a third object of the present invention to provide a method of decorating a rubber extruded product which can attain the above objects and in which excellent adhesion properties between the decoration film and the vulcanized rubber extruded product can be ensured.

The method of decorating a rubber extruded product comprises the steps of: preparing a vulcanized rubber extruded product; extruding a decoration film made of thermoplastic resin at a predetermined thickness and width independently of the vulcanized rubber extruded product; and pressure-bonding the decoration film onto the vulcanized rubber extruded product by a pressure roller before curing to laminate the decoration film on the vulcanized rubber extruded product with thermal fusion and form the rubber extruded product.

In the method of decorating a rubber extruded product according to the present invention, the decoration film is pressure-bonded to the vulcanized rubber extruded product intermittently so as to be laminated on the vulcanized rubber extruded product intermittently, and the decoration film in a non-pressure bonding part is cut away.

In the method of decorating a rubber extruded product according to the present invention, the decoration film is supplied into a space between the vulcanized rubber extruded product and the pressure roller at a temperature which is substantially higher than the melt temperature of the thermoplastic resin, cooled by the pressure roller to a temperature which is substantially lower than the melt temperature of the thermoplastic resin, and then fed out from the space between the vulcanized rubber extruded product and the pressure roller.

This method of decorating a rubber extruded product, configured as described above, can attain the following functions and effects.

In the prior art method, extrusion is directly conducted on a decorating part of a vulcanized rubber extruded product (trim), and the thickness of a film is controlled in an extrusion space defined by the decorating part of the vulcanized rubber extruded product and the orifice of a film extrusion die. By contrast in the present invention, the decoration film is independently extruded, and therefore not affected by any possible vertical movement of the surface of the decorating part which is caused by the movement of the vulcanized rubber extruded product. Consequently, the thickness of the decoration film can be easily controlled.

In the prior art, sliding friction is generated when a vulcanized rubber extruded product is moved in an extrusion die. In the invention, the friction is generated in the form of rolling friction caused by a pressure roller, and therefore the take-up resistance of a vulcanized rubber extruded product is reduced to a very low level.

As a second aspect of the present invention, when the decoration film is extruded at a predetermined thickness and width independently of the vulcanized rubber extruded product, and the decoration film is then pressure-bonded only to the decorating part of the vulcanized rubber extruded product, by a pressure roller before curing so as to laminate, the decoration film in the non-decorating part, which is a non-pressure bonding part, is not substantially adhered to the vulcanized rubber extruded product unless pressure bonding is done. Accordingly, the decoration film in the non-pressure bonding part, the non-decorating part, can be easily cut away.

In the method of intermittently decorating a rubber extruded product according to the present invention, therefore, the process in which a decoration film is adhered to and laminated on the upper face of a vulcanized rubber extruded product concurrently with extrusion so as to intermittently decorate the product can be conducted with excellent productivity. As compared with the prior art method in which different portions are separately extruded, the extruded portions are cut, and the cut portions are then connected to each other, the present method attains a notable effect that the productivity can be remarkably improved.

As a third aspect of the present invention, the decoration film is supplied into the space between the vulcanized rubber extruded product and the pressure roller at a temperature of the thermoplastic resin, cooled by the pressure roller to a temperature which is equal to or lower than the melt temperature of the thermoplastic resin, and then fed out from the space between the vulcanized rubber extruded product and the pressure roller. Therefore, excellent adhesion properties can be ensured between the decoration film and the vulcanized rubber extruded product. It is assumed that the reason of the above is as follows.

The decoration film in a molten state is supplied to the surface of the vulcanized rubber extruded product, and the decoration film is pressure-bonded while being rapidly cooled from the surface side. At the interface between the vulcanized rubber extruded product and the decoration film, therefore, the molten material forming the decoration film partially enters also into a large number of minute pores which exist in the surface of the vulcanized rubber extruded product. Even in the case where embossing, such as by texturing, is applied to the pressure roller, the decoration film is cooled. Accordingly, the material release properties are excellent so that the decoration film is prevented from twining around, or being pulled by, the pressure roller. Also, the pressuring force exerted by the pressure roller is effectively applied to the decoration film. In addition to the chemical adhesion, therefore, the mechanical adhesion, an anchoring effect, is applied to the vulcanized rubber extruded product and the decoration film.

DETAILED DESCRIPTION OF THE PREFERRED EMBODIMENTS

Hereinafter, the invention will be described in detail on the basis of the preferred embodiments. Although examples in which a trim portion of a weather strip is decorated will be described, the invention is not restricted to such examples.

Figure 2:
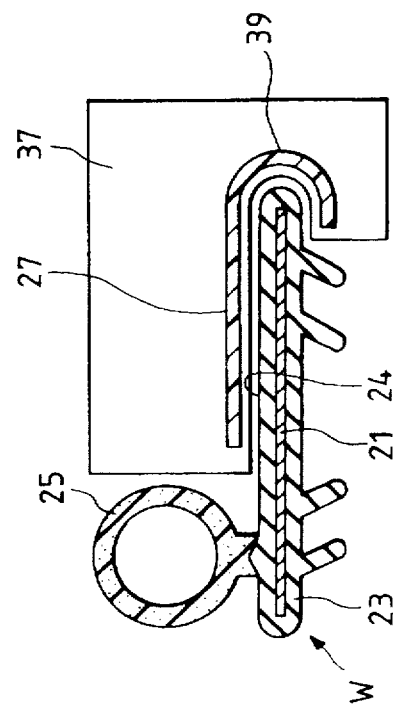
FIG. 2 is a front view showing positional relationships between a film extrusion die and a vulcanized rubber extruded product in an embodiment of the method of the invention.

Rubber material for the weather strip W is first extruded by a crosshead type two-layered co-extruder 13 to form a section shown in FIG. 2. Thereafter, the extruded product is vulcanized by a UHF (microwave) vulcanizer 15, than in a hot air vulcanizer 17, so as to form the weather strip W which is a vulcanized rubber extruded product. The weather strip W includes a trim portion 23, or a decorating part 24 in which an insert 21 is embedded. This trim portion 23 is made of solid rubber. The weather strip W also includes a hollow seal portion 25, which is formed on the side of the upper face of the trim portion 23, and is made of sponge rubber.

Ethylene propylene rubber and chloroprene rubber, which have excellent in weather resistance, are suitable as the rubber material for solid rubber and for the sponge rubber.

Thereafter, a decoration film 27, made of thermoplastic resin or thermoplastic elastomer, is extruded at a predetermined thickness and width independently of the weather strip W as the vulcanized rubber extruded product. The decoration film 27 is then pressure-bonded to the upper face 24 of the trim portion 23 by pressure rollers 31 and 33 before curing (see FIG. 1). This forms the upper face 24 into a decorating part of the product. The film 27 is, therefor, laminated on the decorating part 24 of the weather strip W.

Figure 1:
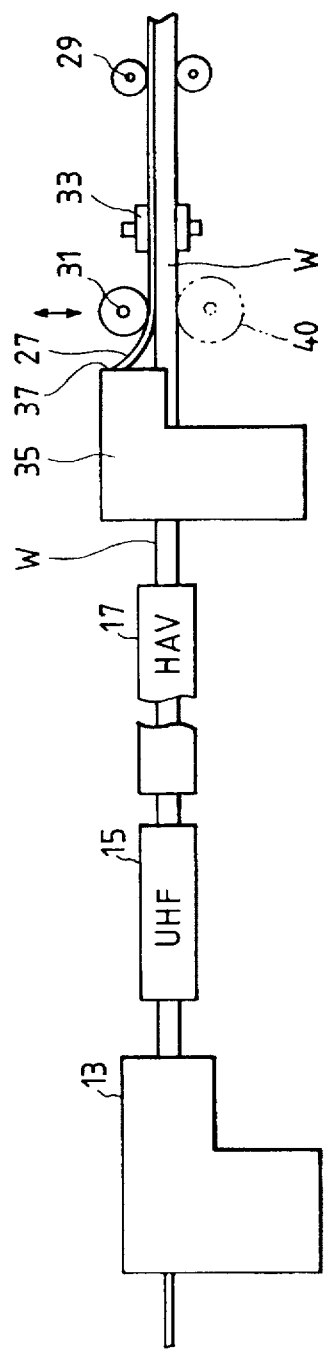
FIG. 1 is a schematic flow diagram showing the method of decorating a vulcanized rubber extruded product according to the invention.

As shown in FIG. 1, a decoration film extruding machine 35 is disposed at a position where the step of vulcanizing the weather strip W is terminated, which is the illustrated example is beyond the outlet of the hot air vulcanizer 17. The pressure rollers 31 and 33 are disposed down stream of the decoration film extrusion die 37 of the machine.

A film shaping orifice 39 of the film extrusion die 37, and the weather strip W are arranged in the relationships shown in FIG. 2. The pressure roller 31 for pressing the upper face and the pressure roller 33 for pressing the edge are arranged in the positional relationships shown in FIGS. 3 and 4 with respect to the weather strip W. In the illustrated example, 29 designates take-up rollers. The pressure rollers 31, 33 are dispose din such a manner that it is possible to move them vertically and horizontally. Such vertical and horizontal movements of the pressure rollers are controlled by a conventional control apparatus, which is not shown, in such a manner that the separation and pressure contact, which are controlled by adjusting the roller interval, are enabled in accordance with the take-up rate of the vulcanized rubber extruded product. Further, a receiving roller 40, shown as a two-dot chain line in FIG. 1, may be disposed opposite pressure roller 31.

Any resin may be used as the thermoplastic resin forming the decoration film 28 so long as it can be thermally fused to the vulcanized rubber extruded product. When using ethylene propylene rubber, a thermoplastic elastomer, such as a polyolefin elastomer or a styrene elastomer, may be used.

Pressure roller 31, which presses the upper face, may be an embossing roller. In this case, it is possible to enhance the design of the decorating part embossing upper face 24.

The embossment is formed by a texturing process such as leather grain embossing, satin embossing, or linear embossing, or by an irregular processing such as knurling.

In the above embodiment, the whole periphery of the weather strip is set as the decorating part. On the other hand where the weather strip includes a decorating par and non-decorating part, only the decorating part may be pressure-bonded by the pressure rollers. The decoration film can be easily cut away by performing clipping or the like on the interface between the non-decorating part and the decorating part after the lamination of the decoration film. The cut away decoration film, which is made of a thermoplastic material, can be recycled so as to be reused.

To obtain the desired and necessary adhesion properties between the trim portion 23 of the weather strip W and the decoration film 27, preferably, the decoration film 27 is supplied into he space between the pressure rollers 31 and 33 and the weather strip W at a temperature which is equal to or higher than the melt temperature of the thermoplastic resin. Relative cooling will occur by the pressure rollers 31 and 33 to a temperature which is equal to or lower than the melt temperature of the thermoplastic resin. Then the resulting composite is fed out from the space between the pressure rollers 31 and 33 and the weather strip W.

The pressure rollers 31 and 33 are usually controlled at a temperature of 40° to 50° C. In order to extrude the decoration film 27 at a temperature higher than the melt temperature of the thermoplastic resin, by 10° to 50° C., and then supply the decoration film 27 into the space between the pressure rollers 31 and 33 and the vulcanized rubber extruded product W at a temperature which is equal to or higher than the melt temperature of the thermoplastic resin, it is preferably to previously heat the vulcanized rubber extruded product W to a temperature which is lower than the melt temperature of the thermoplastic resin by about 50° to 80° C. The melt temperature of the thermoplastic resin in about 150° C.

Figure 5:
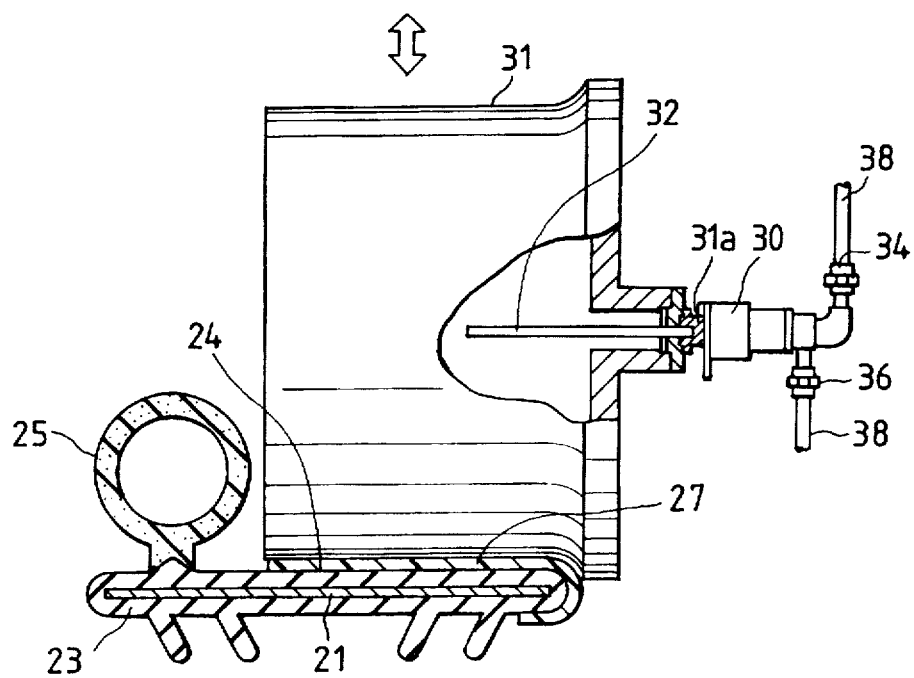
FIG. 5 is a front view showing positional relationships between a pressure roller provided with forced cooling means for pressing the upper face, a decoration film, and the vulcanized rubber extruded product in the embodiment.
Figure 6:
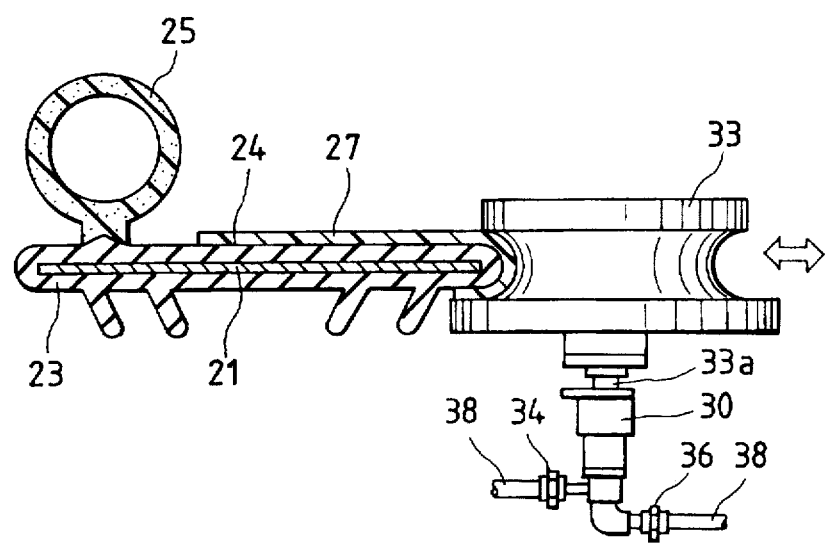
FIG. 6 is a front view showing positional relationships between a pressure roller provided with forced cooling means for pressing the edge, the decoration film, and the vulcanized rubber extruded product in the embodiment.

In this case, pressure rollers 31 and 33 may be forced cooled from the outside. As shown in FIG. 5 and 6, it is preferable to dispose any such forced cooling apparatus for circulating a cooling liquid, such as cooling water, through shafts 31a and 33a. The forced cooling apparatus has a configuration in which a cooling water supply pipe 32, attached to the shaft 31a or 33a, is rotatably supported by a rotary joint 30. Pipe 32 supplies cooling water to a substantially center portion in the longitudinal direction of the respective roller, such as 31 in FIG. 5, and the cooling water is returned through the outer periphery of the base portion of the cooling water supply pipe 32. The reference numerals 34 and 36 designate a cooling water inlet and outlet to which a flexible hose 38 is connected, respectively.

In this case, the mechanical adhesion also is expected to be exerted, and hence it is possible to use a polar thermoplastic elastomer, such as a polyester elastomer or a polyurethane elastomer, even if the thermoplastic resin forming the decoration film 27 is ethylene propylene rubber.

Hereinafter, the invention will be described in more detail on the basis of this embodiment.

As shown in FIG. 1, the weather strip, having the illustrated section W and obtained by extruding an EPDM compound having the composition listed below using a crosshead type coextruder 13, is passed through the UHF vulcanizer 15 and the hot air vulcanizer 17 to form a vulcanized rubber extruded product. The extrusion rate of the decoration from 27 was synchronized with the take-up rate of the extruded product. The decoration film 27 was cooled to room temperature.

On the other hand, a thermoplastic elastomer ("SUMITOMO TPE 5280", EPDM/PP dynamic vulcanized polyolefin type) is extruded from the extrusion die 37 (FIG. 2) of the film extruding machine 35 which is disposed behind the hot air vulcanizer 27 so as to form a film of a thickness of 0.5 mmt, thereby obtaining the decoration film 27. The extrusion conditions were as follows: cylinder temperature: 220° C., extrusion rate: 5 m/min., and temperature of an extrusion material: 180° C.

Figure 3:
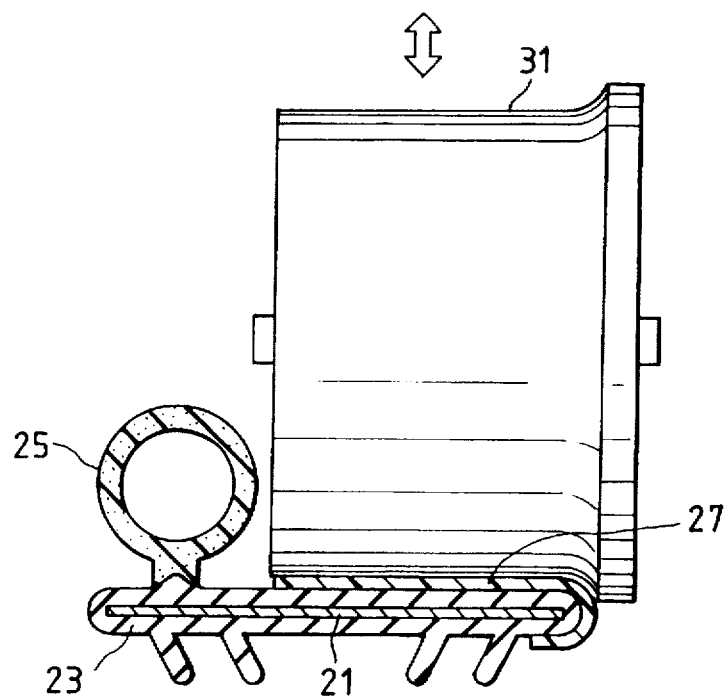
FIG. 3 is a front view showing positional relationships between a pressure roller for pressing the upper face, a decoration film, and the vulcanized rubber extruded product in the embodiment.
Figure 4:
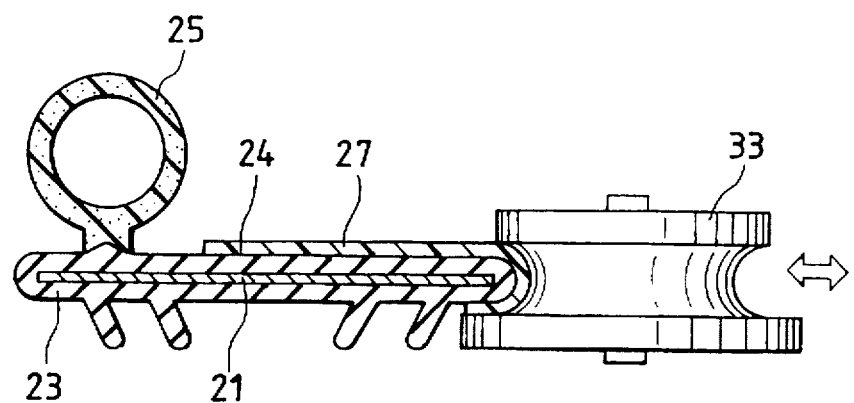
FIG. 4 is a front view showing positional relationships between a pressure roller for pressing the edge, the decoration film, and the vulcanized rubber extruded product in the embodiment.

The extruded film in the uncured state is pressure-bonded by the pressure rollers 31 and 33 for pressing the upper face and edge shown in FIGS. 3 and 4, thereby causing the decoration film 27 to be thermally fused to the trim surface of the weather strip W.

The pieces were collected from the decorating part of the thus prepared weather strip. The test pieces were subject to a 180-deg peel test, with a rate of pulling: 10 cm/min., in accordance with JIS K 6301 so that the adhesive strength between the decoration film and the vulcanized rubber extruded product could be measured. The test reveled that the adhesive strength is 3 kgf/cm with the rubber substrate being broken. It was confirmed that a sufficient adhesive strength can be attained between the decoration film 27 and the weather strip W as a vulcanized rubber extruded product.

Further, under such a condition that the decoration film 27 is intermittently pressure-bonded to the weather strip W, such as creating a decorating part gap of 30 mm and a non-decorating part gap of 23 m, it was confirmed that the same adhesive strength be attained as well as slight adhesive strength between the decoration film 28 and the weather strip.

Composition of EPDM compound (unit: part by weight) is as follows:

| EPDM | 100 parts |
|---|---|
| MAF carbon | 160 parts |
| Plasticizer | 130 parts |
| zinc white | 2 parts |
| Stearic acid | 1 part |
| Sulfur | 1.5 parts |
| Vulcanization accelerator | 4 parts |

When the pressure rollers 31, 33 to which forced cooling means were disposed as shown in FIGS. 5 and 6 are used, a film having a thickness of 0.5 mm was used. The extrusion conditions were as follows: cylinder temperature: 220° C., extrusion rate: 5 n/min., and temperature of an extrusion material: 190° C. Thus, similar results such as shown previously can be obtained.

In the aforementioned embodiments, the decoration film is pressure-bonded to the vulcanized rubber extruded product on one producing line immediately after extruding and vulcanizing a rubber material.

Figure 7A:
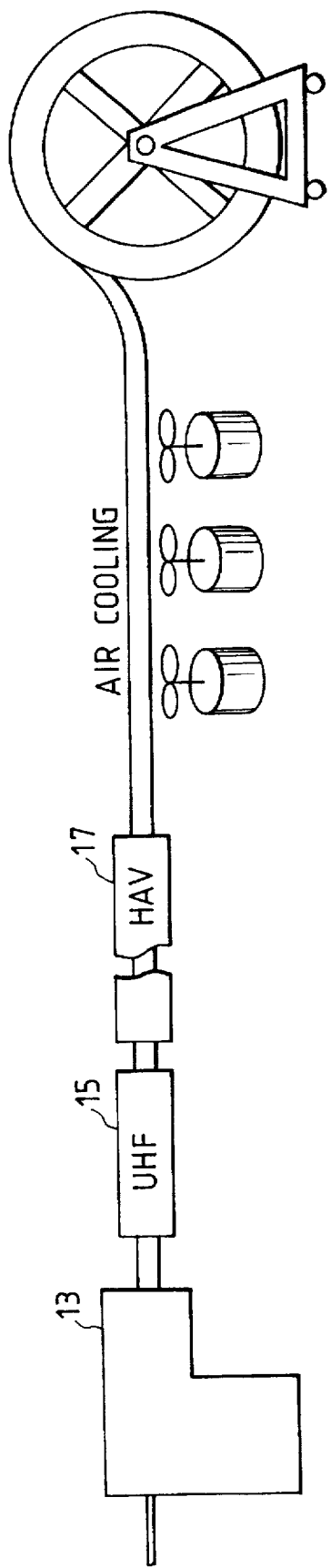
FIGS. 7(a) and 7(b) are schematic flow diagrams showing another embodiment of the present invention.
Figure 7B:
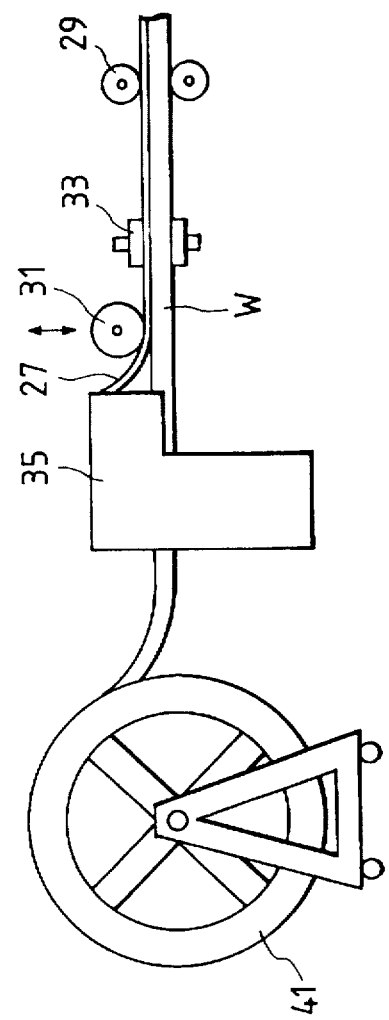

Another embodiment is shown in FIGS. 7(a) and 7(b). The vulcanized rubber extruded product formed on a first producing line, shown in FIG. 7(a), is reeled up for safekeeping. After that, the decoration film is supplied while the vulcanized rubber extruded product formed on the first producing line is extruded on a second producing line as shown in FIG. 7(b). The decoration film and the vulcanized rubber extruded product are here adhered to each other by heat of the decoration film. The adhesive strength can be increased if a heater or the like are disposed between a reel 41 and the decoration film extruding machine 35 in order to heat up the vulcanized rubber extruded product to a temperature ranging from about 70° C. to 90° C.

What is claimed is:

1. A method of decorating a rubber extruded product comprising the steps of:

preparing a vulcanized rubber extruded product;

extruding a thermoplastic resin decoration film at a set thickness and width independently of the vulcanized rubber extruded product;

supplying the decoration film into a space between the vulcanized rubber extruded product and a pressure roller at a temperature which is higher than a melt temperature of the thermoplastic resin of the decoration film by 10° C. to 50° C.;

thermally fusing and embossing the decoration film onto a surface of the vulcanized rubber extruded product before the softened decoration film is cured by pressure-bonding with said pressure roller thereby laminating the decoration film onto the vulcanized rubber extruded product to form a decorated rubber extruded product;

cooling the decoration film and the vulcanized rubber extruded product to a temperature which is substantially lower than the melt temperature of the thermoplastic resin by cooling the pressure roller with a forced cooling medium; and advancing a completed product from the pressure roller.

2. The method according to claim 1, wherein the decoration film is pressure-bonded to the vulcanized rubber extruded product intermittently by the pressure roller so as to be laminated on the vulcanized rubber extruded product intermittently, and the additional step of cutting away non-pressure-bonded portions is performed.

* * * * *